US007719992B1

(12) United States Patent
Gourlay et al.

(10) Patent No.: US 7,719,992 B1
(45) Date of Patent: May 18, 2010

(54) SYSTEM FOR PROACTIVE TIME DOMAIN REFLECTOMETRY

(75) Inventors: Douglas Gourlay, Sausalito, CA (US); Omar Abuabara, San Francisco, CA (US); Vinayak M. Kamat, San Jose, CA (US); Marco Foschiano, Pinerolo (IT)

(73) Assignee: Cisco Tchnology, Ink., San Jose, CA (US)

( * ) Notice: Subject to any disclaimer, the term of this patent is extended or adjusted under 35 U.S.C. 154(b) by 950 days.

(21) Appl. No.: 10/890,593

(22) Filed: Jul. 14, 2004

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*G05B 11/01* (2006.01)
*G01R 15/00* (2006.01)
*G01C 17/38* (2006.01)

(52) U.S. Cl. .................... 370/252; 370/254; 700/12; 700/17; 702/57; 702/94

(58) Field of Classification Search ................ 370/241, 370/252, 254
See application file for complete search history.

(56) References Cited

U.S. PATENT DOCUMENTS

| | | | | | |
|---|---|---|---|---|---|
| 4,684,872 | A | * | 8/1987 | Stewart | ................. 320/125 |
| 5,268,644 | A | * | 12/1993 | Klassen et al. | .............. 324/503 |
| 6,044,081 | A | | 3/2000 | Bell et al. | |
| 6,253,270 | B1 | | 6/2001 | Ajanovic et al. | |
| 6,275,889 | B1 | * | 8/2001 | Saito | .......................... 710/313 |
| 6,324,168 | B1 | * | 11/2001 | Richardson | ................. 370/254 |
| 6,590,867 | B1 | | 7/2003 | Ash et al. | |
| 6,771,644 | B1 | | 8/2004 | Brassil et al. | |
| 6,876,632 | B1 | | 4/2005 | Takeda | |
| 6,947,417 | B2 | | 9/2005 | Laursen et al. | |
| 7,457,252 | B2 | * | 11/2008 | Karam et al. | ............... 370/252 |
| 2002/0014282 | A1 | | 2/2002 | Andersson et al. | |
| 2002/0186661 | A1 | | 12/2002 | Santiago et al. | |

(Continued)

FOREIGN PATENT DOCUMENTS

EP    1 553 735 A1    7/2005

*Primary Examiner*—Seema S Rao
*Assistant Examiner*—Xavier Szewai Wong
(74) *Attorney, Agent, or Firm*—The Law Offices of Bradley J. Bereznak

(57) ABSTRACT

A method for cable diagnostics in a network includes performing a test to determine initial state information for each of a plurality of lines coupled to a switch and storing the initial state information in a database. When a change in the state of a line is detected, the test is re-run to determine new state information of the line. The new state information is stored in the database and a message that identifies the change in state and a likely cause of the state change is issued to a network operator. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

9 Claims, 4 Drawing Sheets

U.S. PATENT DOCUMENTS

| | | |
|---|---|---|
| 2003/0048756 A1* | 3/2003 | Chang et al. ................. 370/252 |
| 2003/0076850 A1 | 4/2003 | Jason, Jr. |
| 2003/0163272 A1* | 8/2003 | Kaburlasos et al. ......... 702/110 |
| 2003/0174719 A1* | 9/2003 | Sampath et al. ............. 370/402 |
| 2004/0015309 A1* | 1/2004 | Swisher et al. ................ 702/79 |
| 2004/0073690 A1 | 4/2004 | Hepworth et al. |
| 2004/0153264 A1* | 8/2004 | Teich et al. .................... 702/65 |
| 2004/0213152 A1 | 10/2004 | Matuoka et al. |
| 2005/0007959 A1* | 1/2005 | Tomonaga et al. .......... 370/248 |
| 2005/0141431 A1* | 6/2005 | Caveney et al. ............. 370/241 |
| 2006/0273246 A1* | 12/2006 | Browning et al. ...... 250/227.14 |
| 2006/0290356 A1* | 12/2006 | Pharn et al. ................. 324/533 |

* cited by examiner

| Port No. | Initial | Up / Down |
|----------|---------|-----------|
| 1 | 78 / T | 0 / O |
| 2 | 78 / T | 78 / O |
| 3 | 78 / T | 73 / O |
| 4 | 78 / T | 55 / S |
| 5 | 78 / T | 78 / T |

SYSTEM FOR PROACTIVE TIME DOMAIN REFLECTOMETRY

FIELD OF THE INVENTION

The present invention relates generally to digital computer network technology; more particularly, to methods and apparatus related to cable integrity in a network.

BACKGROUND OF THE INVENTION

Computer networks using cables to link devices such as computers are common and the number of such networks is growing. Ethernet, a Media Access Control (MAC) layer network communications protocol specified by Institute of Electrical and Electronics Engineers (IEEE) Standard 802.3 (1985) (which also defines the physical layer (PHY) characteristics) and Token Ring, specified by IEEE Standard 802.5 (1985), are just two of the many standards for such networks known in the art. In addition to these standards, there are also many proprietary or non-standard network configurations. An example of a typical Ethernet network connection to an office location is described in U.S. Pat. No. 6,115,468. A system and method for implementing an Ethernet protocol in a local area network (LAN) is disclosed in U.S. Pat. No. 6,487,214.

In order to maintain the integrity of wire connections in a LAN, network administrators generally implement some sort of scheme for detecting cable faults. One common approach is to measure the physical length of the existing network cables using well-known devices such as Time Domain Reflectometers (TDRs). A TDR device measures cable length by sending a signal down the cable and measuring the reflection back. A standard TDR may be built into the ports of Ethernet switches so that if a short occurs somewhere along the length of the cable, the reflected TDR signal from the discontinuity can be used to detect the problem and identify the point where the cable is shorted or broken. Network service personnel may then be dispatched to attempt to correct the problem. By way of further background, U.S. Pat. No. 6,614,236 describes a prior art method and apparatus for checking cable integrity by measuring the length of a cable link in a computer network.

One of the problems with past cable measuring approaches is that they tend to be passive and only provide limited information, i.e., that the cable link is shorted a certain distance from a network line card. For example, if a wire is unplugged from a computer node, the network operator typically might receive an error message that a particular physical port of the LAN left the bridge or lost its carrier signal. Plugging the cable wire back into the computer might result in a message that the port has joined the bridge. This type of limited error reporting information can make troubleshooting certain types of network cable problems difficult and time consuming.

Thus, there is need for a system that simplifies network management and operational control of cable network links by providing enhanced diagnostic and error reporting information.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIG. 2 is an exemplary database table utilized in accordance with one embodiment of the present invention.

DETAILED DESCRIPTION

A system for proactive time domain reflectometry that provides intelligent network diagnostics and error reporting capabilities is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

Figure 1:
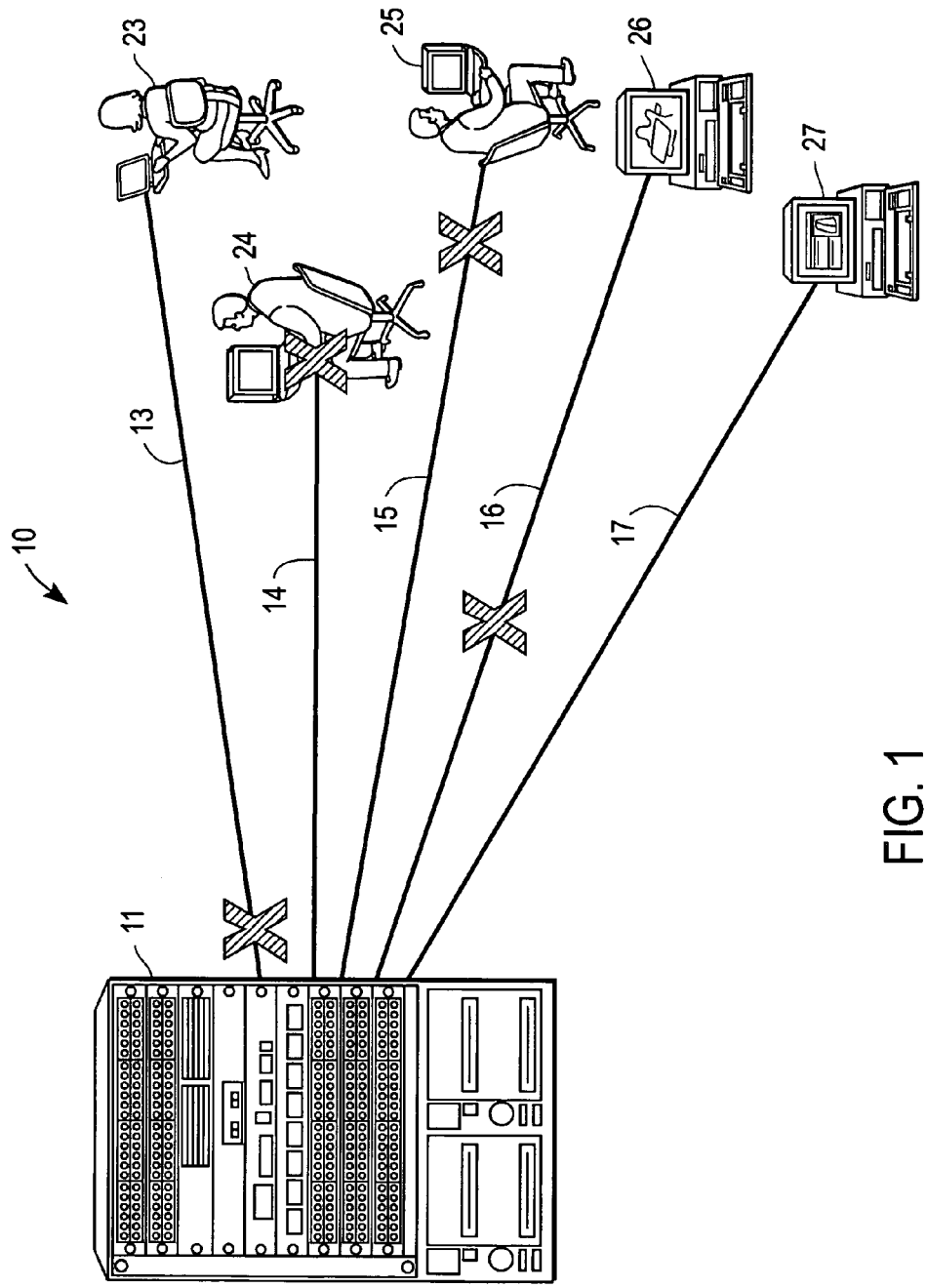
FIG. 1 illustrates a computer network with an integrated TDR in accordance with one embodiment of the present invention.

FIG. 1 illustrates an exemplary system 10 providing network service to a number of users/host devices 23-27 in accordance with one embodiment of the present invention. In this example, system 10 comprises a modular Ethernet switch 11, which has a plurality of ports connected to host devices 23-27 via conventional cables 13-17, respectively. Cables 13-17 may be coaxial cables, twisted-pair (TP) cables, or optical (i.e., fiber) cables. In an actual implementation, switch 11 may include dozens, or even hundreds, of Ethernet ports capable of providing an aggregate data throughput at a rate of hundreds of million packets per second (Mpps).

Figure 4:
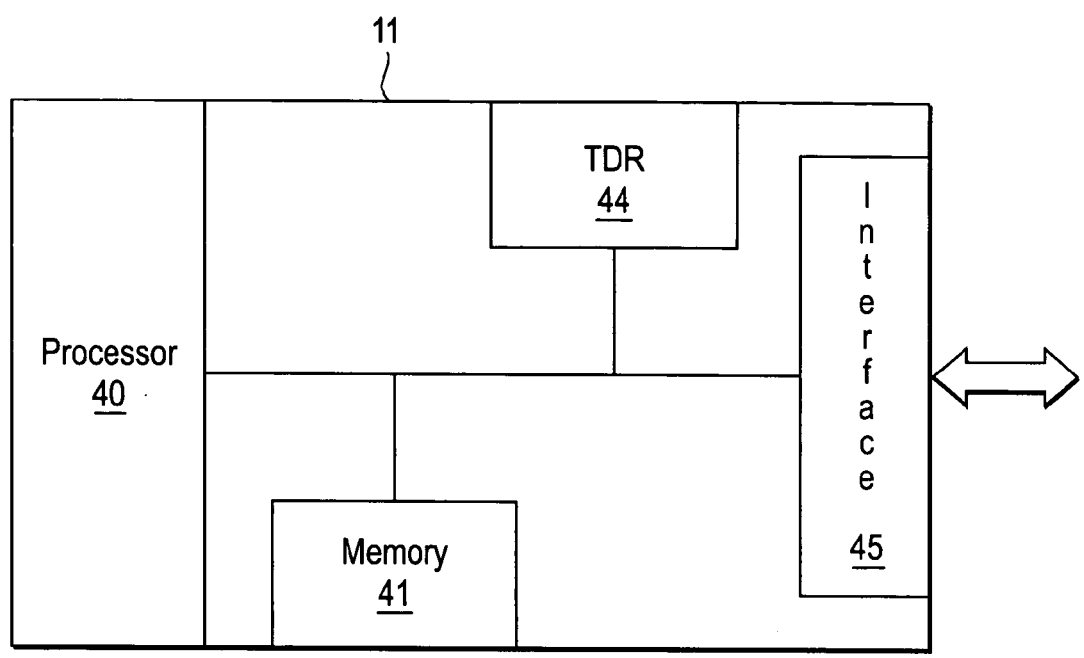
FIG. 4 is a conceptual block diagram of a network switch according to one embodiment of the present invention.

FIG. 4 is a conceptual block diagram showing an exemplary switch 11 that includes a processor 40 coupled with a memory unit 41, TDR module 44, and an input/output (I/O) interface 45 comprising a plurality of port modules. Data is transferred between memory unit 41 and processor 40, and between the processor and I/O interface over a system bus. Other implementation may include a separate memory bus coupled between memory unit 41 and processor 40. Processor 40 may comprise a single-chip processor, or a multi-processor system optimized for networking applications.

According to the present invention, a layer of network intelligence is integrated into switch 11 that provides a network administrator or operator with enhanced diagnostic and error reporting information. This is achieved by incorporating a database into switch 11 that records baseline and transitory information about the operating status of each port and the line protocol status of each connection to the respective ports of switch 11. The method and apparatus of the present invention may be understood more fully by considering the following example.

Figure 3:
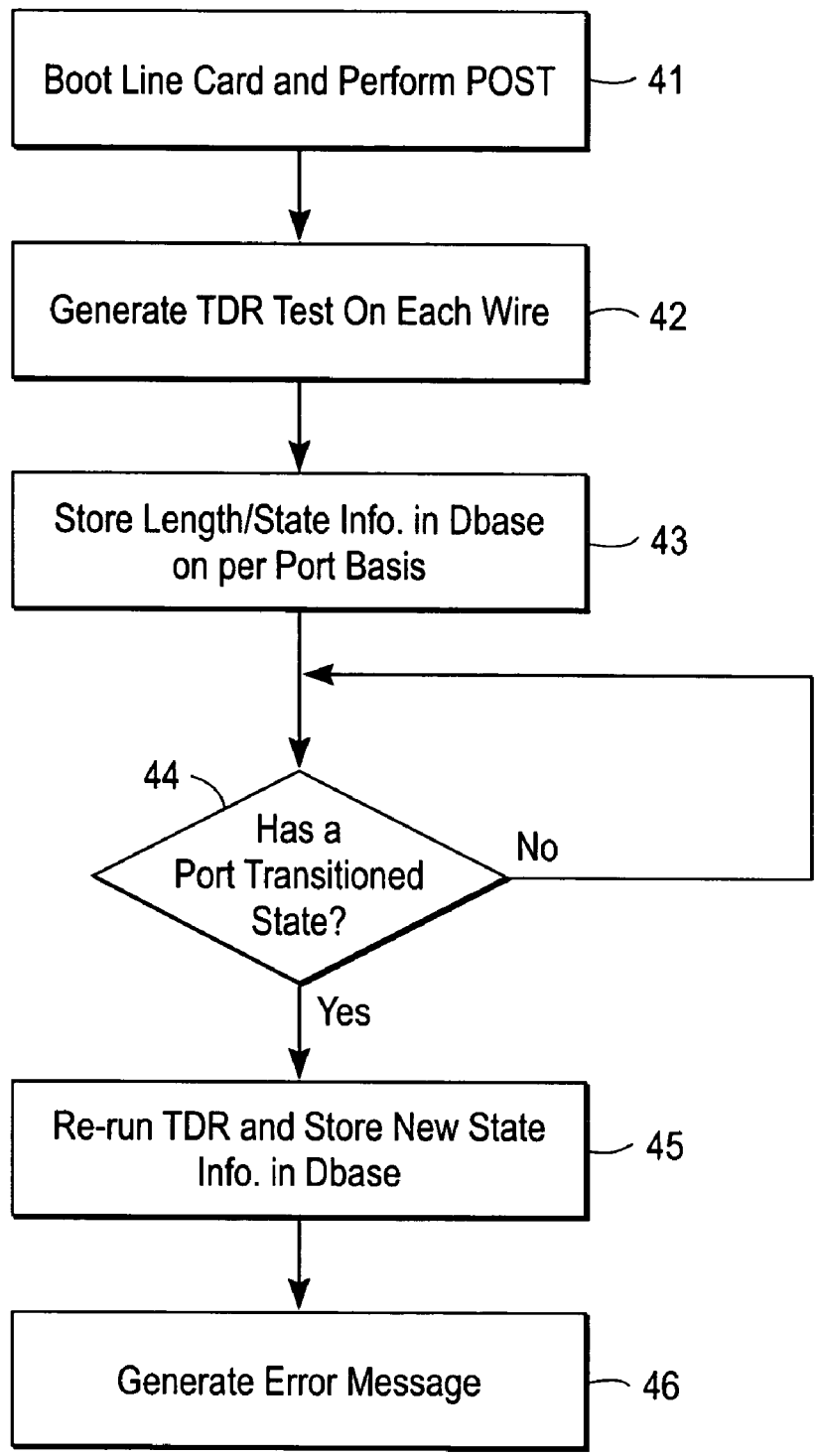
FIG. 3 is a flowchart of a method of operation for a computer network according to one embodiment of the present invention.

When switch 11 is initially turned on, a line card associated with each port is powered-on and a standard power-on self test (POST) routine is executed by a processor associated with switch 11, as shown by block 41 of the flowchart of FIG. 3. As part of the POST routine, the cable connected to each port is measured by an ordinary TDR device included on the line card or incorporated into switch 11. Typically, PHY component routines incorporated in switch 11 determine the type of cable, the number of wires, and the physical parameters of the transmission media (e.g., transmission speed of a signal in the medium, impedance, etc.). This information may be stored in internal tables or memory within the switch. Once this parametric information has been obtained, a TDR test may be performed. As part of the POST routine, firmware or software may utilize the raw TDR test results in conjunction with the aforementioned parametric information to generate meaningful, user-readable results.

In the system of FIG. 1, for example, each of the host devices 23-27 is shown connected to a set of corresponding ports (e.g., ports 1-5) of switch 11 via wire cables 13-17, respectively. Assuming that each cable has a length of 78 meters, the result of running the POST routine is that the TDR tests (block 42 in FIG. 3) produce a result of 78 meters/terminated for each cable wire. In other words, running the TDR test results in a cable length measurement and a line protocol status determination for each of cables 13-17. This information is stored in a database table (block 43) on a per port basis.

FIG. 2 illustrates one embodiment of a database that may be utilized in one embodiment of the present invention. As can be seen, the database of FIG. 2 comprises a table with three columns 31-33 with separate rows that correspond to each of the ports of switch 11. The entries of column 31 are the port identification numbers of the various ports, while the entries in column 32 denote the cable length/line protocol status when the system is initially powered-up. In this example, the initial status when the line cards of each port are first booted (i.e., POST is run and a TDR test is performed) is 78 m/terminated (T). In other words, the entries in column 32 represent a known good operating state of each of the respective cable connections of the network. The entries in column 33 denote the change in state that occurs when a transitional event is detected on the respective cable links. The information in the database of FIG. 2 is typically maintained on a real-time basis, with the data of column 33 being stored and/or updated in response to a change in port status or line protocol status, as explained in more detail below.

Practitioners in the networking arts will appreciate that the database of FIG. 2 may be expanded in other embodiments to include additional information. For example, since the PHY logic circuitry is able to discern the type of cable wire connection to a port (e.g., 2-wire, 4-wire, etc.) this information may also be stored in the database of FIG. 2.

Continuing with the example of FIGS. 1 and 2, assume that after powering-up to a known good state, each of the cables/connections experiences a failure. Each of these failures is depicted in FIG. 1 by a large "X", which denotes a discontinuity in the cable connection between switch 11 and its associated host device. For example, in the case of host 23, cable 13 is shown unplugged from switch 11. According to the present invention, the change in state that occurs when the port is unplugged from switch 11 (block 44 in FIG. 3) triggers re-running of the TDR test and storage of the new state information in the row of column 33 associated with the particular port (block 45). In this case, the TDR test produces a "0 m/open" result. That is, port 1 transitioned "78 m/T" to "0 m/O". The port may also be viewed as transitioning from an "administrator up/line protocol up" (up/up) state to an "administrator up/line protocol down" (up/down) state.

At this point, a relatively straightforward software or firmware routine may be utilized to compare the baseline information (stored in column 32) with the transition information (stored in column 33) and provide an analysis of the likely cause of the problem based on a set of common or known failure scenarios. In the case of port 1, for example, because the cable length went from 78 m to 0 m, a likely cause of this change is that the cable was unplugged from the switch. Thus, an error message may be generated (block 46) for the network administrator such as, "Port 1/24 left bridge group 5; was 78 m/terminated, now is 0 m/open; probable cause: cable unplugged from switch." It is appreciated that his added level of intelligence greatly assists troubleshooting, debugging and allocation of network operations staff resources to fix the problem.

With continuing reference to the examples shown in FIGS. 1 & 2, the transitional event causing a change in the operating state of port 2 connected to cable 14 is disconnection of the cable from host 24. In this case, the state transition is from "78 m/T" to "78 m/O", which produces an error message indicating to the network administrator that the most likely cause of the problem is that cable 14 is now unplugged from end station 23.

In the case of port 3, the failure event detected is that the administrator/line protocol state transitioned from "8 m/T" to "73 m/O". Because the discontinuity occurred very near to the host connection, the error analysis routine may be programmed to return a message indicating that the most likely cause of the short is that cable 15 was unplugged from a patch panel. Where a short is detected farther down the line, say, at 55 m as shown in the entry of column 33 ("55 m/S") associated with port 4 the error analysis routine may be programmed to return an error message that the cable 16 was probably cut 55 meters from the switch.

The final failure case shown in FIGS. 1 & 2 is that of a server 27 going down, i.e., a catastrophic network failure. The physical (PHY) layer event that drives re-running of the TDR test in this case is a lost Ethernet connection to server 27. Thus, the port transitions from an administrator up/line protocol up (up/up) state, to an administrator up/line protocol down (up/down) state, even though the detected cable length and termination status is not shown having changed. This information may be interpreted by the error analysis routine as the serving going down, triggering the issuance of an appropriate (e.g., urgent) message being sent to the network administrator.

As an alternative, or in addition, to re-running of the TDR test responsive to up/down PHY layer events, a time-sensitive repetitive test of the TDR status of a cable may be performed. For instance, on an unconnected and MAC layer "down" port, a TDR test could run repetitively at a predetermined interval (e.g., every 300 seconds). If the TDR status of the cable transitions without a MAC layer transition, e.g., cable was "78 m/O" and is now "55 m/S", a reasonable inference may be drawn that the cable is not capable of sustaining connectivity. Such a situation might be caused, for example, by routine wiring closet maintenance that occurs during off-hours.

In another embodiment of the present invention, a network service priority level may be assigned to certain types of error messages. In the above example, for instance, the highest priority error message may be produced in response to the situation where a server fails. In that case, an error message requesting urgent servicing attention might be sent to the highest level network administrative personnel. In contrast, when a relatively low level employee unplugs his computer from the network, an innocuous error message may be sent to a network operator with no recommendation for servicing or other action. It is appreciated that the present invention also supports any number of intermediate priority service error messages.

It should also be understood that although the embodiments described thus far have shown a single state transition entry associated with each port following initial power-up, the database utilized in the present invention may be expanded to store a multitude of state changes associated with a particular port or cable connection. Such information may be used, for example, to generate histograms, identify faulty ports, or other systemic problems that otherwise might escape detection.

Additionally, persons of skill in the art will recognize that a great variety of error analysis/reporting routines may be written for execution on a number of different processor or controller devices. It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. For example, instead of a physical layer event triggering re-running of the TDR test, it is appreciated that in certain cases a loss of MAC layer signaling may be used as the triggering event. Accordingly, the specification and drawings are to be regarded in an illustrative rather than a restrictive sense.

We claim:

1. A method of operation for a network switch that connects with multiple nodes of a local area network (LAN), the network switch being operable to inspect received data packets, determine a source and destination of each data packet, and forward each of the data packets over the LAN toward the destination, the method comprising:
    performing a time domain reflectometry (TDR) test to determine initial state information for each of a plurality of lines for transmitting the data packets coupled to the network switch, the initial state information produced by the TDR test includes a length measurement and a protocol status for each of the plurality of lines;
    storing the initial state information in a database;
    detecting a change in the state of a line;
    re-running the test to determine new state information of the line, the new state information including an updated length measurement and an updated protocol status for the line;
    storing the new state information in the database;
    issuing a message that identifies the change in state and a likely cause of the change.

2. The method of claim 1 wherein the message comprises a diagnostics message issued to a network administrator.

3. A method of cable diagnostics for a network that includes a switch having a plurality of ports which are coupled to a corresponding plurality of devices via a corresponding plurality of cables, the switch being operable to inspect received data packets, determine a source and destination of each data packet, and forward each of the data packets over the network toward the destination, the method comprising:
    performing a time domain reflectometry (TDR) test to determine initial state information for each of the plurality of cables coupled to the switch, the initial state information including cable length and line protocol status;
    storing the initial state information in a database;
    monitoring each of the cables for changes in state;
    re-running the TDR test on a cable that changes state to determine new state information of the cable, the new state information including updated cable length and updated line protocol status;
    storing the new state information in the database;
    executing, responsive to the new state information, a software or firmware routine that compares the initial state information with the new state information and issues a message that identifies a likely cause of the change in the state of the cable.

4. The method of claim 3 wherein the message is issued to a network administrator.

5. The method of claim 3 wherein the message is an error message that identifies one of a plurality of connection failure mechanisms.

6. The method of claim 5 wherein the plurality of connection failure mechanisms includes an open circuit, a short circuit, an unplugged connection, and a device failure.

7. A computer program product comprising a computer useable medium and computer readable code embodied on the computer useable medium, execution of the computer readable code causing the computer program product to:
    execute a power-on self test (POST) that includes time domain reflectometry (TDR) measurement on each plurality of lines connected to a corresponding plurality of ports of a switch;
    store initial state information produced by the TDR measurement in a database, the initial state information produced by the TDR test includes a length measurement and a protocol status for each of the plurality of lines;
    monitor the ports to detect a change in the state of a line;
    re-run the TDR measurement on the line in response to the detected change;
    store new state information associated with the line in the database, the new state information including an updated length measurement and an updated protocol status for the line.

8. The computer program product of claim 7 wherein execution of the code further causes the computer product to issue a message to a network operator indicating a likely cause of the change in state of the line.

9. The computer program product of claim 7 wherein the initial and new state information includes cable length and line protocol status.

* * * * *

UNITED STATES PATENT AND TRADEMARK OFFICE
CERTIFICATE OF CORRECTION

PATENT NO.        : 7,719,992 B1                                    Page 1 of 1
APPLICATION NO.   : 10/890593
DATED             : May 18, 2010
INVENTOR(S)       : Gourlay et al.

It is certified that error appears in the above-identified patent and that said Letters Patent is hereby corrected as shown below:

On Title page Item (73)

On the first page, the Assignee: "Cisco Tchnology, Ink." should read -- Cisco Technology, Inc. --.

Signed and Sealed this
Twenty-first Day of June, 2011

David J. Kappos
*Director of the United States Patent and Trademark Office*